(12) United States Patent
Santana et al.

(10) Patent No.: US 9,392,047 B1
(45) Date of Patent: Jul. 12, 2016

(54) FACILITATING APPLICATION COMPATIBILITY ACROSS DEVICES

(75) Inventors: Armando Santana, Carlsbad, CA (US); Dave Mohla, Irvine, CA (US)

(73) Assignee: Amazon Technologies, Inc., Seattle, WA (US)

(*) Notice: Subject to any disclaimer, the term of this patent is extended or adjusted under 35 U.S.C. 154(b) by 423 days.

(21) Appl. No.: 13/614,378

(22) Filed: Sep. 13, 2012

(51) Int. Cl.
*H04L 29/08* (2006.01)
*G06F 9/455* (2006.01)
*H04W 4/00* (2009.01)

(52) U.S. Cl.
CPC ............ *H04L 67/10* (2013.01); *G06F 9/45537* (2013.01); *G06F 9/455* (2013.01); *H04W 4/003* (2013.01)

(58) Field of Classification Search
CPC ..... G06F 9/455; G06F 9/45537; H04W 4/003
See application file for complete search history.

(56) References Cited

U.S. PATENT DOCUMENTS

| | | | | |
|---|---|---|---|---|
| 5,475,845 | A * | 12/1995 | Orton et al. | 719/328 |
| 2004/0034853 | A1* | 2/2004 | Gibbons et al. | 717/174 |
| 2007/0100648 | A1* | 5/2007 | Borquez et al. | 705/1 |
| 2007/0192082 | A1* | 8/2007 | Gaos et al. | 703/27 |
| 2008/0256564 | A1* | 10/2008 | Fathalla | 719/331 |
| 2010/0217883 | A1* | 8/2010 | Goya | 709/230 |
| 2010/0233996 | A1* | 9/2010 | Herz et al. | 455/411 |
| 2010/0262619 | A1* | 10/2010 | Zargahi et al. | 707/770 |
| 2011/0055247 | A1* | 3/2011 | Blumberg et al. | 707/769 |
| 2011/0258301 | A1* | 10/2011 | McCormick et al. | 709/222 |
| 2011/0321029 | A1* | 12/2011 | Kern et al. | 717/170 |
| 2012/0158732 | A1* | 6/2012 | Mital et al. | 707/741 |
| 2012/0210236 | A1* | 8/2012 | Prasad | 715/738 |
| 2012/0299811 | A1* | 11/2012 | Amendolagine et al. | 345/156 |
| 2012/0311548 | A1* | 12/2012 | Ko et al. | 717/140 |
| 2012/0315972 | A1* | 12/2012 | Olson et al. | 463/17 |
| 2013/0055227 | A1* | 2/2013 | Zachariah | 717/168 |
| 2013/0166417 | A1* | 6/2013 | Pulkowski et al. | 705/27.1 |
| 2013/0167135 | A1* | 6/2013 | Neumann et al. | 717/174 |
| 2013/0191495 | A1* | 7/2013 | Almstrand et al. | 709/217 |
| 2013/0254675 | A1* | 9/2013 | de Andrade et al. | 715/746 |
| 2014/0059161 | A1* | 2/2014 | Saib | 709/217 |
| 2014/0143087 | A1* | 5/2014 | Ahn et al. | 705/26.7 |

OTHER PUBLICATIONS

U.S. Appl. No. 13/099,753 entitled "Reducing Latency for Remotely Executed Applications" and filed May 3, 2011.
U.S. Appl. No. 13/114,534 entitled "Remotely Emulating Computing Devices" and filed May 24, 2011.
U.S. Appl. No. 13/172,500 entitled "Remote Access to Mobile Communication Devices" and filed Jun. 29, 2011.
U.S. Appl. No. 13/172,503 entitled "Application Control Translation" and filed Jun. 29, 2011.
U.S. Appl. No. 13/174,995 entitled "Executing Applications in Remotely Emulated Computing Devices" and filed Jul. 1, 2011.
U.S. Appl. No. 13/191,585 entitled "Remotely Preconfiguring a Computing Device" and filed Jul. 27, 2011.

(Continued)

*Primary Examiner* — Joe Chacko
(74) *Attorney, Agent, or Firm* — Thomas | Horstemeyer (57) ABSTRACT

Disclosed are various embodiments that facilitate compatibility of applications across multiple different devices. It is determined whether an application is compatible with a client device. If the application is not compatible, an application wrapper to facilitate execution of the application by the client device is encoded. The application wrapper is then provided for transfer to the client device.

24 Claims, 6 Drawing Sheets

(56) References Cited

OTHER PUBLICATIONS

U.S. Appl. No. 13/407,919 entitled "Reducing Input Processing Latency for Remotely Executed Applications" and filed Feb. 29, 2012.

U.S. Appl. No. 13/529,095 entitled "Hosted Mobile Device Infrastructure" and filed Jun. 21, 2012.

U.S. Appl. No. 13/540,045 entitled "Evaluating Application Compatibility" and filed Jul. 2, 2012.

* cited by examiner

FACILITATING APPLICATION COMPATIBILITY ACROSS DEVICES

BACKGROUND

Mobile computing has recently emerged as a new direction for computing architecture. With mobile computing, the human-computer interface has migrated away from traditional keyboard and mouse input devices and toward touch, audio, and video input devices. Applications developed for mobile computing may be specially designed to be compatible with the smaller displays often employed in mobile devices. Currently there is a proliferation of different kinds of mobile devices (e.g., smartphones, tablets, electronic book readers, etc.) having different hardware configurations and different operating systems. Unfortunately, applications developed for one kind of mobile device may not be compatible with another kind of mobile device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to facilitating compatibility of applications across multiple different devices. The proliferation and rapid advancements regarding mobile devices often cause user frustration. Mobile applications written for one operating system (e.g., Android®) may be incompatible with another operating system (e.g., iOS®, Windows® Phone, etc.). Incompatibilities may also arise among different versions of the same operating system, devices made by different manufacturers, devices having different hardware characteristics, and so on. Particular mobile devices may quickly become obsolete in view of rapid technological advancement and increasing hardware requirements of applications.

Figure 1:
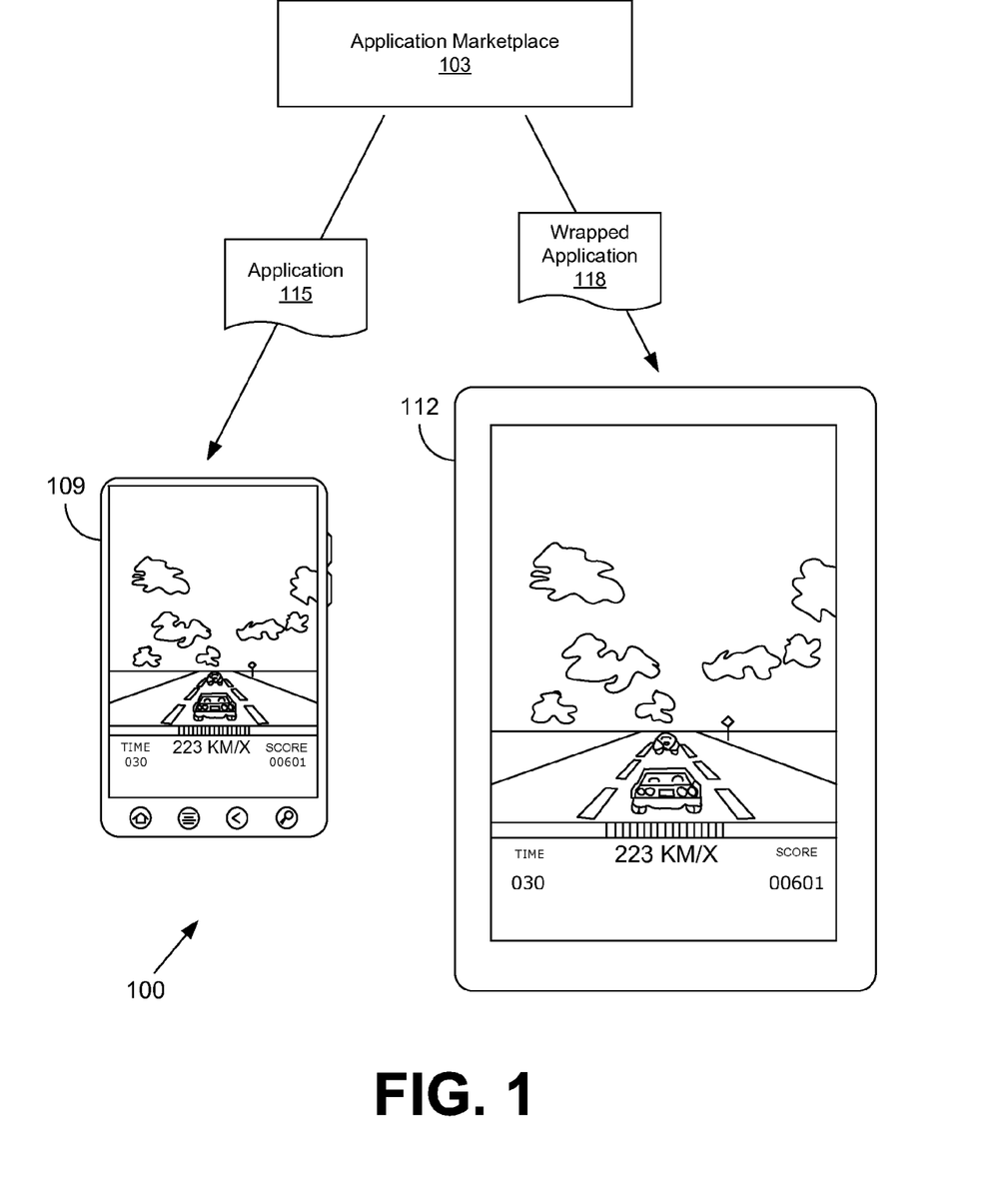
FIGS. 1 and 2 are drawings of a networked environment according to various embodiments of the present disclosure.

Various embodiments of the present disclosure facilitate compatibility of applications across different devices through emulation and/or remote execution. With reference to FIG. 1, shown is one example of a networked environment 100 according to various embodiments. The networked environment 100 includes an application marketplace 103, a compatible client 109, and an incompatible client 112. The application marketplace 103 offers a multitude of applications 115 from a multitude of developers.

Suppose that a game or other application 115 is available through the application marketplace 103. The application 115 may be compatible only with a specific mobile device platform. The compatible client 109 represents a mobile device having this specific mobile device platform. The compatible client 109 is able to obtain the application 115 from the application marketplace 103 and then natively execute it within an operating system environment. The incompatible client 112, however, cannot natively execute the application 115.

Figure 3:
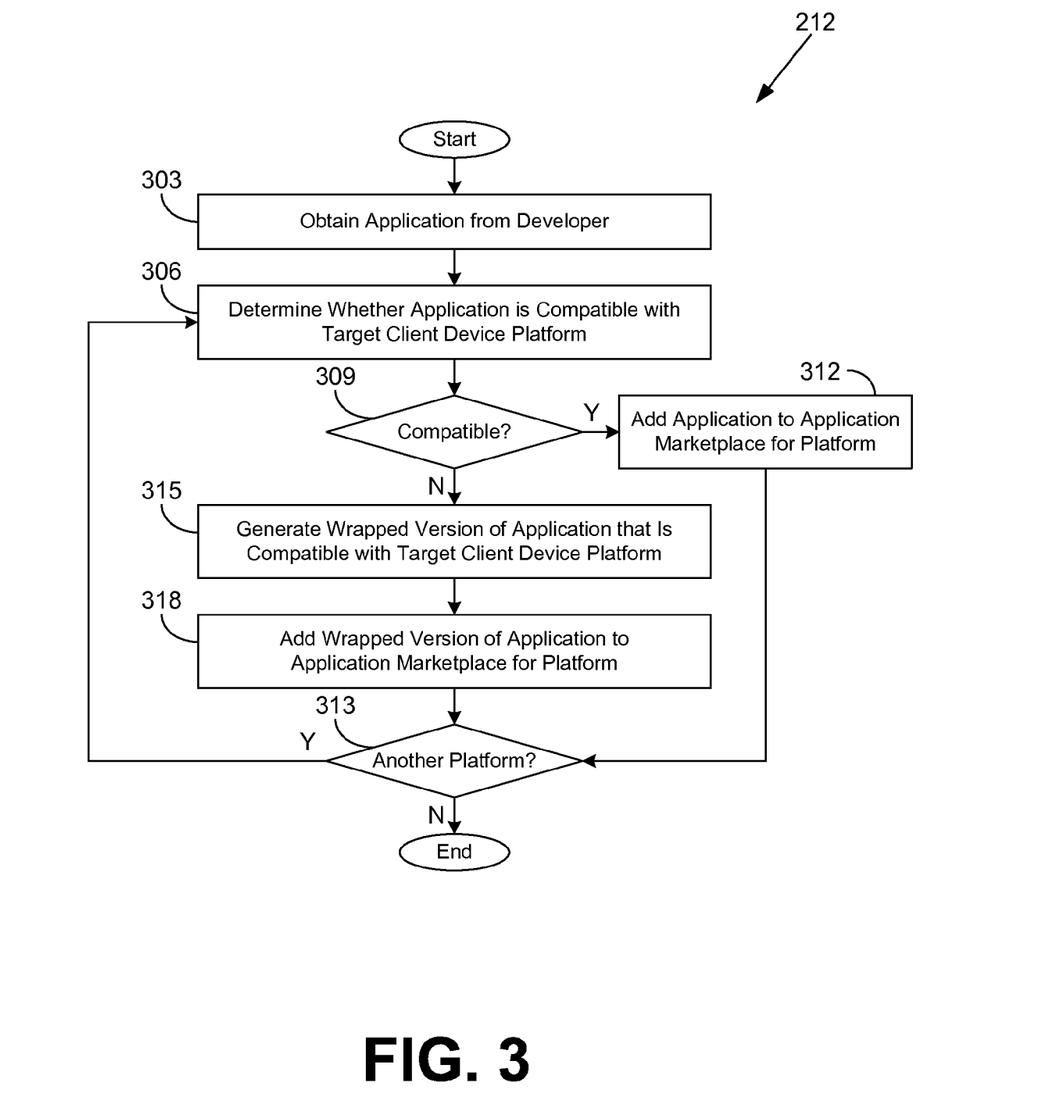
FIG. 3 is a flowchart illustrating one example of functionality implemented as portions of an application ingestion service executed in a computing environment in the networked environment of FIG. 2 according to various embodiments of the present disclosure.

To facilitate use of the application 115 through the incompatible client 112, the application marketplace 103 is configured to encode the application 115 using a wrapper, thereby producing a wrapped application 118. The wrapped application 118 is compatible with the incompatible client 112. As a non-limiting example, the wrapped application 118 may include an emulator for the specific mobile device platform. Alternatively, the wrapped application 118 may facilitate communication with a remotely executed instance of the application 115. As shown in FIG. 3, users of the compatible client 109 and the incompatible client 112 are both able to obtain and use the application 115 with similar experiences.

Various techniques relevant to remote execution of applications and application compatibility are described in U.S. patent application Ser. No. 13/099,753 entitled "REDUCING LATENCY FOR REMOTELY EXECUTED APPLICATIONS" and filed on May 3, 2011; U.S. patent application Ser. No. 13/114,534 entitled "REMOTELY EMULATING COMPUTING DEVICES" and filed on May 24, 2011; U.S. patent application Ser. No. 13/172,500 entitled "REMOTE ACCESS TO MOBILE COMMUNICATION DEVICES" and filed on Jun. 29, 2011; U.S. patent application Ser. No. 13/172,503 entitled "APPLICATION CONTROL TRANSLATION" and filed on Jun. 29, 2011; U.S. patent application Ser. No. 13/174,995 entitled "EXECUTING APPLICATIONS IN REMOTELY EMULATED COMPUTING DEVICES" and filed on Jul. 1, 2011; U.S. patent application Ser. No. 13/191,585 entitled "REMOTELY PRECONFIGURING A COMPUTING DEVICE" and filed on Jul. 27, 2011; U.S. patent application Ser. No. 13/407,919 entitled "REDUCING INPUT PROCESSING LATENCY FOR REMOTELY EXECUTED APPLICATIONS" and filed on Feb. 29, 2012; U.S. patent application Ser. No. 13/529,095 entitled "HOSTED MOBILE DEVICE INFRASTRUCTURE" and filed on Jun. 21, 2012; and U.S. patent application Ser. No. 13/540,045 entitled "EVALUATING APPLICATION COMPATIBILITY" and filed on Jul. 2, 2012; which are all incorporated herein by reference in their entirety. In the following discussion, a general description of the system and its components is provided, followed by a discussion of the operation of the same.

Figure 2:
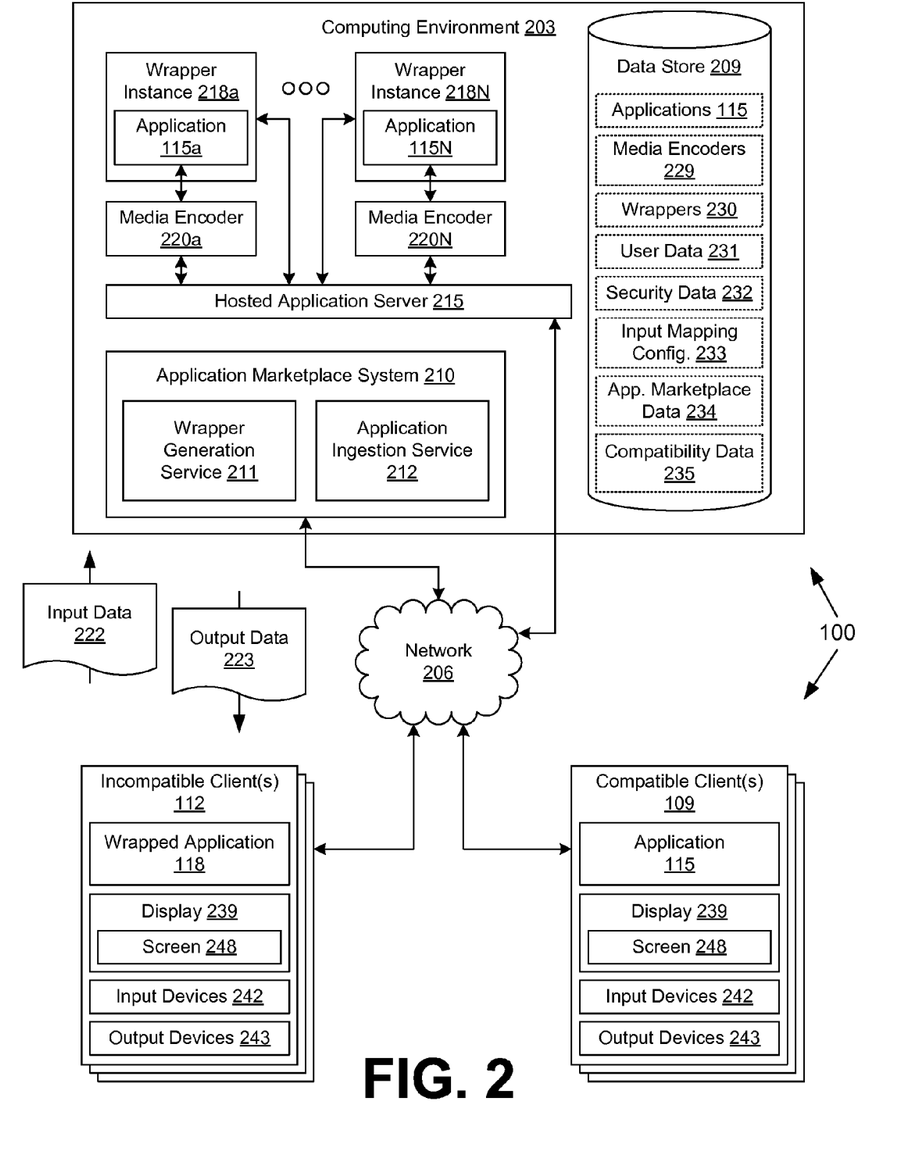

With reference to FIG. 2, shown is a detail view of the networked environment 100 of FIG. 1 according to various embodiments. The networked environment 100 includes a computing environment 203, one or more compatible clients 109, and one or more incompatible clients 112 in data communication via a network 206. The network 206 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209, for example, is associated with the operation of the various applications and/or functional entities described below.

The components executed on the computing environment 203, for example, include an application marketplace system 210 that includes a wrapper generation service 211 and an application ingestion service 212, a hosted application server 215, a plurality of wrapper instances 218a . . . 218N executing a plurality of instances of applications 115a . . . 115N, a plurality of media encoders 220a . . . 220N, and other applications, services, processes, systems, engines, or functionality not discussed in detail herein. The application marketplace system 210 is executed to provide functionality (e.g., generating user interface, facilitating electronic commerce transactions, providing other backend functionality, etc.) for the application marketplace 103 (FIG. 1), where developers are able to offer applications 115 for sale, lease, download, and/or other forms of consumption.

An application marketplace 103 facilitates user acquisition of applications 115. The applications 115 may be provided by many different developers. Such acquisition may include purchases and downloads, free downloads, trial downloads, upgrades, unlocking, and/or other types of acquisitions. The application marketplace system 210 may facilitate user searching of available applications 115 and/or browsing of applications 115 according to genre, category, title, release date, and so on. The application marketplace system 210 may perform user authentication and charging of various payment instruments, such as credit cards, electronic checks, lines of credit, gift cards, etc. to facilitate electronic payment for applications 115.

The application marketplace system 210 may comprise commercially available hypertext transfer protocol (HTTP) server applications such as Apache® HTTP Server, Apache® Tomcat®, Microsoft® Internet Information Services (IIS), and/or other servers. The application marketplace system 210 may employ HTTP, simple object access protocol (SOAP), representational state transfer (REST), and/or other networking protocols.

The application ingestion service 212 is executed to generate user interfaces and perform functionality related to maintaining the presence of a developer in an application marketplace 103. A developer, as used herein, may correspond to a user or business entity corresponding to a source or distributor of an application 115. The application ingestion service 212 may allow a developer at a developer client to submit or upload applications 115, establish pricing for applications 115, establish metadata for applications 115, customize merchandising for the applications 115 in the application marketplace 103, and/or perform other functions.

Once a developer provides an application 115, the application ingestion service 212 may then add the application 115 to the application marketplace 103. The application ingestion service 212 may perform various tasks relating to configuring the application marketplace 103 to offer the application 115. For example, the application ingestion service 212 may determine various requirements of the application 115 such as supported operating systems, supported display resolutions or sizes, supported wireless carriers, processor requirements, memory requirements, and so on. As will be described, the application ingestion service 212 may add a wrapped version of the application 115 to the application marketplace 103 to facilitate compatibility of the application 115 with other target device platforms.

The wrapper generation service 211 generates wrapped versions of the application 115 to facilitate application compatibility. In one embodiment, the wrapper generation service 211 may bundle a wrapper or emulator with the application 115 such that the application 115 is configured to execute in incompatible clients 112. In another embodiment, the wrapper generation service 211 may generate a wrapped application 118 that communicates with a wrapper instance 218 executed in a hosted environment of the computing environment 203.

The hosted application server 215 is executed to launch wrapper instances 218. The hosted application server 215 may correspond to a hypervisor for the wrapper instances 218 in some embodiments. The hosted application server 215 is also executed to obtain input data 222 from the incompatible clients 112 and provide the input data 222 to the respective wrapper instance 218.

The hosted application server 215 is also executed to send output data 223 that is captured from the application 115 through the wrapper instance 218 to the incompatible clients 112. The hosted application server 215 may communicate with the incompatible client 112 over various protocols such as, for example, HTTP, SOAP, REST, real-time transport protocol (RTP), real time streaming protocol (RTSP), real time messaging protocol (RTMP), user datagram protocol (UDP), transmission control protocol (TCP), and/or other protocols for communicating data over the network 206.

In some embodiments, the hosted application server 215 may be configured to perform various processing on the input data 222 obtained from the incompatible client 112. Such processing may involve performing gesture recognition on raw gesture data captured, for example, by a touch screen of the incompatible client 112. The raw gesture data may also include user input data captured from other input devices of the incompatible client 112. In another embodiment, the incompatible client 112 may be configured to perform this processing instead.

In various scenarios, the processing may include applying a high pass filter, applying a low-pass filter, performing an interpolation, and/or performing other signal processing techniques. Further, the hosted application server 215 may perform forward prediction to estimate missing or delayed user input data. The hosted application server 215 may also correct or adjust previous predictions in response to additional user input data being obtained. Once the user input data is processed (e.g., to identify a gesture), the processed result is provided to the respective wrapper instance 218, for example, by way of an application programming interface (API) or other interface. Alternatively, the user input data may be provided directly to the wrapper instance 218 without processing.

The applications 115 may correspond to mobile phone applications, gaming applications, social networking applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. The application 115 may expect to access one or more resources of the device on which it is executed. Such resources may correspond to display devices, input devices, or other devices. In some cases, the application 115 may request exclusive access to one or more of the resources, whereby no other applications may have access to the particular resources.

The wrapper instance 218 provides a hosted environment for execution of the application 115. In various embodiments, the wrapper instance 218 may be configured to provide a virtualized or emulated environment for the application 115 by virtualizing one or more of the resources that the application 115 expects to access. Such resources may include a touchscreen, a keypad, a mouse, a joystick, a video device, a sound device, etc. In this way, the wrapper instance 218 is able to provide input commands to the application 115 as if the wrapper instance 218 emulates a keyboard, a mouse, an accelerometer, a touch screen, or another type of input device.

Further, the wrapper instance 218 may be able to obtain a video signal generated by the application 115 as if the wrapper instance 218 emulates a display device, an audio device, or another type of output device. The wrapper instance 218 is able to encode the video signal and/or audio signal by way of a media encoder 220 into a media stream. To this end, the wrapper instance 218 may include various types of media encoders 220, such as, for example, Moving Pictures Experts Group (MPEG) encoders, H.264 encoders, Flash® media encoders 220, etc. Such media encoders 220 may be selected according to factors such as, for example, data reduction, encoding quality, latency, etc.

In some embodiments, the wrapper instance 218 may communicate directly with the incompatible clients 112 to obtain the input data 222 and to serve up the output data 223. Also, in some cases, the draw commands or other video rendering commands may be intercepted from the wrapper instance 218 and transmitted to the incompatible client 112 in the media stream for rendering by the incompatible client 112. Thus, instead of video being encoded, the commands used to render the video may be encoded and transmitted to the incompatible client 112.

Different types of wrapper instances 218 may be provided for different applications 115 or classes of applications 115. Where the application 115 is configured for execution in a specialized mobile computing device or another type of computing device, the wrapper instance 218 may include an emulation application that emulates the device. In some embodiments, the output of the application 115 may be captured by the wrapper instance 218 at a device level. For example, the application 115 may be executed in a physical mobile device, and the video output may be captured by way of a video graphics array (VGA) connection, a high-definition multimedia interface (HDMI) connection, a component video connection, a national television system committee (NTSC) television connection, and/or other connections.

The data stored in the data store 209 includes, for example, applications 115, media encoders 229, wrappers 230, user data 231, security data 232, input mapping configurations 233, application marketplace data 234, compatibility data 235, and potentially other data. The applications 115 correspond to a library of different applications from the application marketplace 103. The applications 115 may correspond to executable code within one or more of the wrapper instances 218. A particular application 115 may be executed in multiple wrapper instances 218 for multiple application sessions. In some cases, applications 115 may be available on-demand as a service. Fees for use of the application 115 provided as a service may be assessed based on time usage, instance usage, or other factors.

The media encoders 229 correspond to the various types of media encoders 220 that may be employed in the computing environment 203. Some media encoders 229 may correspond to specific formats, such as, for example, H.264, MPEG-4, MPEG-2, and/or other formats. The wrappers 230 correspond to the executable code and data that implements the various types of wrapper instances 218 and client-side code that is packaged with an application 115 in a wrapped application 118. In one embodiment, the wrappers 230 include file system images.

The user data 231 includes various data related to the users of the application marketplace 103. Such user data 231 may include modified mobile device instance images, file data generated through the use of a wrapped application 118, configuration data, billing data, contact data, and/or other data. The user data 231 may indicate which applications 115 that the user has acquired a right to use or access. The user data 231 may also include browsing history, order history, identifiers for registered devices, and/or other information. The security data 232 may define users who are permitted to access particular wrapper instances 218, security credentials, file permissions, password policies, security policies, firewall configurations, encryption policies, and/or other data. Where a user employs an enterprise account, the security data 232 may enforce various policies on the user as desired by the enterprise.

The input mapping configuration 233 may define mappings of gestures or other forms of input from client input devices to actual or virtual input devices of wrapper instances 218. As a non-limiting example, a voice gesture detected by an incompatible client 112 may be mapped by the input mapping configuration 233 to a touchscreen swipe gesture provided to a wrapper instance 218. The input mapping configuration 233 may configure mapping of devices under one mobile device platform to devices under another mobile device platform.

The application marketplace data 234 may include data related to various applications 115 offered in the application marketplace 103. The application marketplace data 234 may include licensing restrictions, access restrictions, pricing information, order information, metadata for applications 115, information pages, category and taxonomy structures, reviews, ratings, screenshots, and/or other data that may be employed in merchandising applications 115 in the application marketplace 103.

The compatibility data 235 may be employed to determine whether a given application 115 is compatible with a target client device platform. The compatibility data 235 may include device capability data pertaining to each client device. The device capability data may specify, for example, an operating system version, a wireless carrier, installed applications 115 and libraries, whether the device has a global positioning system (GPS) device, whether the device has a camera, the processor, the memory, and so on. The compatibility data 235 may also include application requirements data obtained from the application 115. The application requirements data may include security requirements, feature requirements, and/or other requirements for the client devices to meet before an application 115 may be downloaded and/or installed onto the client devices. Such requirements may be determined from a manifest or other file included in the application 115. Additionally, such requirements may be ascertained by way of analyzing the code of the application 115, executing the code of the application 115 and determining which features are accessed, and/or by other approaches. In some cases, the requirements may be manually specified by a developer through a user interface generated by the application ingestion service 212.

The incompatible clients 112 and compatible clients 109 are representative of a plurality of client devices that may be coupled to the network 206. Each of the incompatible clients 112 and compatible clients 109 may comprise, for example, a processor-based system such as a computer system. Such a computer system may be embodied in the form of a laptop computer, personal digital assistants, cellular telephones, smartphones, set-top boxes, music players, web pads, tablet computer systems, game devices, electronic book readers, or other devices with like capability. Although the incompatible clients 112 and compatible clients 109 may correspond to mobile devices, the incompatible clients 112 and compatible clients 109 may correspond to desktops or fixed computing devices in some instances.

Each of the incompatible clients 112 and compatible clients 109 may include a display 239. The display 239 may comprise, for example, one or more devices such as liquid crystal display (LCD) screens, gas plasma-based flat panel displays, or other types of display devices, etc. Each of the incompatible clients 112 and compatible clients 109 may include one or more input devices 242. The input devices 242 may comprise, for example, devices such as accelerometers, light guns, game controllers, touch pads, touch sticks, touch screens, push buttons, optical sensors, microphones, webcams, keyboards, mice, joysticks, and/or any other devices that can provide user input. Additionally, various input devices 242 may incorporate haptic technologies in order to provide feedback to the user. The output devices 243 may correspond to the output sections of haptic input devices 242, vibration devices, buzzing devices, audio devices, indicator lights, seven-segment display devices, and so on.

The incompatible client 112 may be configured to execute various applications such as a wrapped application 118 and/or other applications. The incompatible client 112 may be configured to execute applications beyond the wrapped application 118 such as, for example, mobile applications, browser applications, email applications, instant message applications, and/or other applications.

In a first embodiment, a wrapped application 118 is executed to allow a user to launch and interact with wrapper instances 218 executed in the computing environment 203. To this end, the wrapped application 118 is configured to capture input data provided by the user through one or more of the input devices 242 and send this input over the network 206 to the computing environment 203 as input data 222. The incompatible client 112 may correspond to a "thin" client or a "thick" client, depending the processing to be performed at the client side versus by the computing environment 203 for the wrapper instance 218. For example, normal processing of the input data 222 by the incompatible client 112 may be bypassed in favor of server-side processing in various embodiments.

The wrapped application 118 is also configured to obtain output data 223 over the network 206 from the computing environment 203 and render a screen 248 on the display 239. To this end, the wrapped application 118 may include one or more video and audio players to play out a media stream generated by an application 115. In one embodiment, the wrapped application 118 comprises a plug-in within a browser application. It is noted that different types of wrapped applications 118 may be employed for different types of wrapper instances 218. Further, some wrapped applications 118 may support multiple types of wrapper instances 218.

In a second embodiment, the wrapped application 118 includes an emulator that is configured to emulate a compatible environment for an application 115. In other words, the wrapped application 118 may include the code for the application 115 and may be able to emulate the compatible environment without interacting with wrapper instances 218.

The compatible client 109 may be configured to execute various applications such as an application 115 and/or other applications. In contrast to the incompatible client 112, the compatible client 109 is configured to execute the application 115 natively without an emulator and without interacting with wrapper instances 218. The compatible client 109 may be configured to execute applications beyond the application 115 such as, for example, mobile applications, browser applications, email applications, instant message applications, and/or other applications.

Next, a general description of the operation of the various components of the networked environment 100 is provided. To begin, a developer provides an application 115 to the application marketplace system 210. The application ingestion service 212 adds the application 115 to the application marketplace 103. The application ingestion service 212 stores the application 115 in the data store 209 and updates the application marketplace data 234. One or more target client device platforms may be configured for the application marketplace 103. The application ingestion service 212 may evaluate whether the application 115 is compatible with the target client device platforms. If not compatible, the application marketplace system 210 may employ the wrapper generation service 211 to generate a wrapped version of the application 115 to facilitate compatibility.

The wrapper generation service 211 may package the application 115 as a wrapped application 118 by including a standalone emulator that provides a compatible environment within the otherwise incompatible target client device platform. Alternatively, the wrapper generation service 211 may configure instances of the application 115 to be executed by wrapper instances 218 in the computing environment 203. The wrapper generation service 211 may then generate a wrapped application 118 that corresponds to a client application for the hosted application server 215. The wrapped version of the application 115 may be added to the application marketplace 103 and may be advertised as being compatible with the target client device platform (e.g., a specific device, operating system version, etc.).

When an end user interacts with the application marketplace system 210, the user may request a particular application 115. If the user has rights to the application 115, access to obtain the application 115 may be granted. If the user does not have rights, the application marketplace system 210 may facilitate acquisition of such rights. In some embodiments, the application marketplace system 210 may generate wrapped versions of applications 115 on demand as needed according to the capabilities of client devices associated with application requests.

If the client device of the end user is a compatible client 109, the application marketplace system 210 may merely send the application 115 to the compatible client 109. By contrast, if the client device of the end user is an incompatible client 112, the application marketplace system 210 may generate and/or send the wrapped application 118 for the application 115 to the incompatible client 112. Depending on the implementation and resources available to the incompatible clients 112, execution of the wrapped application 118 may appear to be the same as, or at least similar to, execution of the application 115 by the compatible client 109.

Turning now to FIG. 3, shown is a flowchart that provides one example of the operation of a portion of the application ingestion service 212 according to various embodiments. It is understood that the flowchart of FIG. 3 provides merely an example of the many different types of functional arrangements that may be employed to implement the operation of the portion of the application ingestion service 212 as described herein. As an alternative, the flowchart of FIG. 3 may be viewed as depicting an example of steps of a method implemented in the computing environment 203 (FIG. 2) according to one or more embodiments.

Beginning with box 303, the application ingestion service 212 obtains an application 115 (FIG. 2) from a developer. In box 306, the application ingestion service 212 determines whether the application 115 is compatible with one of potentially multiple target client device platforms according to the compatibility data 235 (FIG. 2). In box 309, if the application 115 is compatible with the platform, the application ingestion service 212 proceeds to box 312. In box 312, the application ingestion service 212 adds the application 115 to the application marketplace 103 for the platform (FIG. 1). In so doing, the application ingestion service 212 may configure the application marketplace data 234 (FIG. 2) for the application marketplace 103 so that the application marketplace 103 advertises the compatibility of the application 115 with the target client device platforms. Thereafter, the application ingestion service 212 proceeds to box 313.

If the application 115 is not compatible in box 309, the application ingestion service 212 instead proceeds to box 315. In box 315, the application ingestion service 212 uses the wrapper generation service 211 (FIG. 2) to generate a wrapped application 118 (FIG. 2) that is compatible with the target client device platform. In some cases, the wrapped application 118 may include an emulator that facilitates compatibility of the application 115 with the target client device platform. In other cases, the wrapped application 118 may include a client application that communicates with a wrapper instance 218 (FIG. 2) executed in the computing environment 203 (FIG. 1). The client application may be configured to render a user interface corresponding to the application 115 based at least in part on a media stream generated by the wrapper instance 218 or a media encoder 220 (FIG. 2) coupled to a wrapper instance 218.

In box 318, the application ingestion service 212 adds the wrapped application(s) 118 to the application marketplace 103 for the platform. In so doing, the application ingestion service 212 may configure the application marketplace data 234 for the application marketplace 103 so that the application marketplace 103 advertises the compatibility of the wrapped application 118 with the target client device platform(s). Also, the application ingestion service 212 may configure the hosted environment of the computing environment 203 for executing wrapper instances 218 for the application 115. In box 313, the application ingestion service 212 determines whether there is another target client device platform to be processed for the instant application 115. If another platform remains to be processed, the application ingestion service 212 returns to box 306 and determines whether the application 115 is compatible with the next platform. Otherwise, the portion of the application ingestion service 212 ends.

Figure 4:
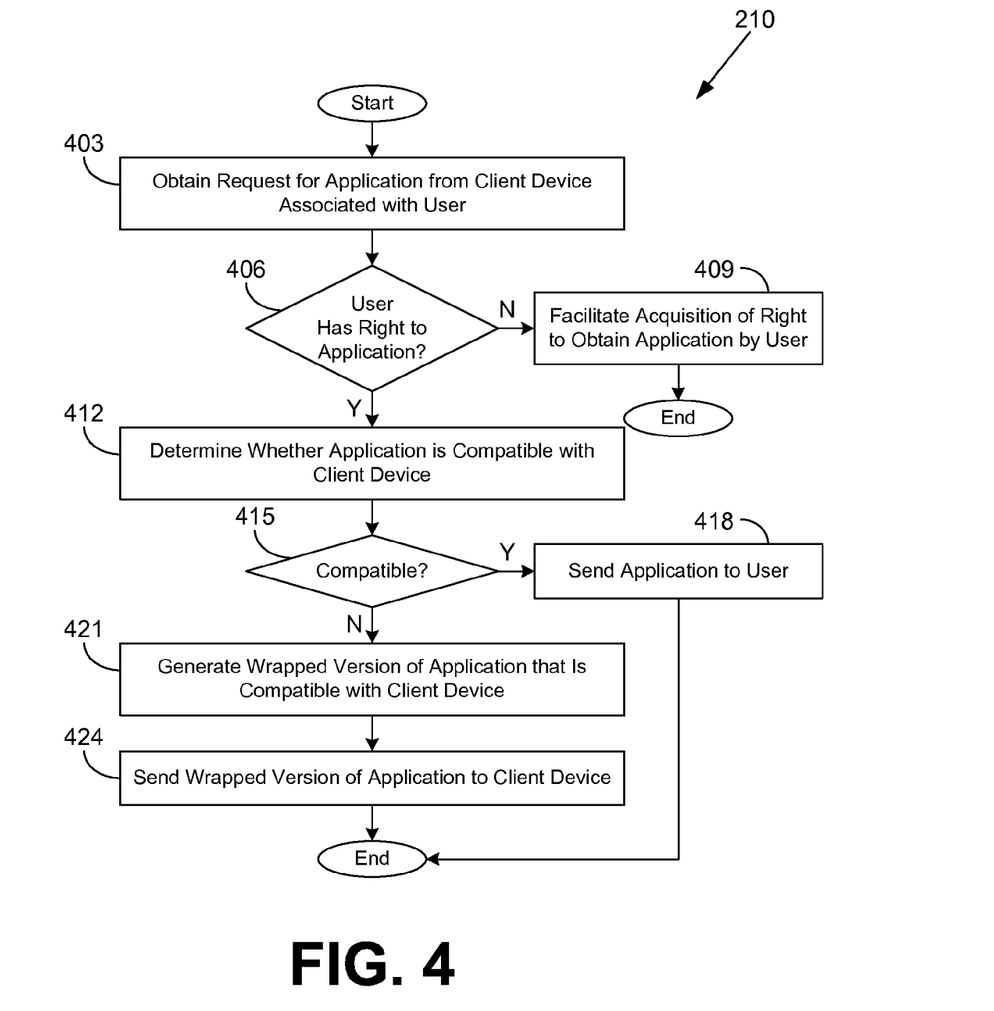
FIG. 4 is a flowchart illustrating one example of functionality implemented as portions of an application marketplace system executed in a computing environment in the networked environment of FIG. 2 according to various embodiments of the present disclosure.

Moving on to FIG. 4, shown is a flowchart that provides one example of the operation of a portion of the application marketplace system 210 according to various embodiments. It is understood that the flowchart of FIG. 4 provides merely an example of the many different types of functional arrangements that may be employed to implement the operation of the portion of the application marketplace system 210 as described herein. As an alternative, the flowchart of FIG. 4 may be viewed as depicting an example of steps of a method implemented in the computing environment 203 (FIG. 2) according to one or more embodiments.

Beginning with box 403, the application marketplace system 210 obtains a request for an application 115 (FIG. 2) from a client device (i.e., a compatible client 109 (FIG. 2) or an incompatible client 112 (FIG. 2)) associated with a user. In box 406, the application marketplace system 210 determines whether the user has a right to obtain the application 115. For example, the user may have previously purchased the application 115 for use on another client device owned by the user, and licensing terms may permit the right. If the user does not have the right, the application marketplace system 210 moves to box 409 and facilitates an acquisition of the right to obtain the application 115 by the user. Thereafter, the portion of the application marketplace system 210 ends.

If the user does have the right to obtain the application 115, the application marketplace system 210 continues from box 406 to box 412. In box 412, the application marketplace system 210 determines whether the application 115 is compatible with the client device. In box 415, if the application 115 is compatible, the client device is a compatible client 109, and the application marketplace system 210 moves to box 418. In box 418, the application marketplace system 210 sends the application 115 to the user. The application 115 may be sent directly to the client device, or the application 115 may be provided to another client device for transfer to the target client device. Thereafter, the portion of the application marketplace system 210 ends.

If the application 115 is not compatible in box 415, the client device is an incompatible client 112 and the application marketplace system 210 continues to box 421. In box 421, the application marketplace system 210 generates a wrapped application 118 (FIG. 2) using the wrapper generation service 211 (FIG. 2), where the wrapped application 118 is compatible with the incompatible client 112. The wrapped application 118 may include an emulator or may be a client application for the hosted application server 215 (FIG. 2). The application marketplace system 210 then sends the wrapped application 118 to the incompatible client 112 in box 424. Thereafter, the portion of the application marketplace system 210 ends.

Figure 5:
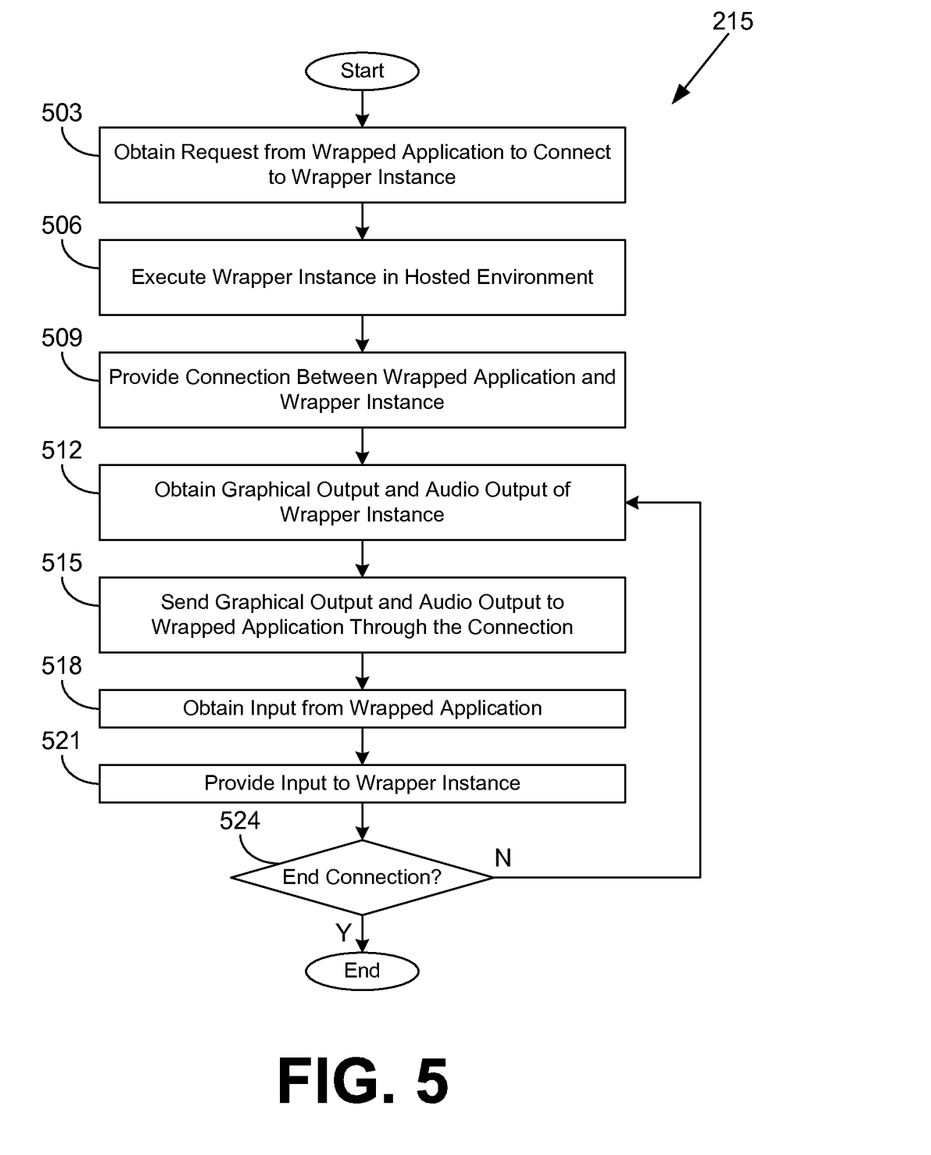
FIG. 5 is a flowchart illustrating one example of functionality implemented as portions of a hosted application server executed in a computing environment in the networked environment of FIG. 2 according to various embodiments of the present disclosure.

Referring next to FIG. 5, shown is a flowchart that provides one example of the operation of a portion of the hosted application server 215 according to various embodiments. It is understood that the flowchart of FIG. 5 provides merely an example of the many different types of functional arrangements that may be employed to implement the operation of the portion of the hosted application server 215 as described herein. As an alternative, the flowchart of FIG. 5 may be viewed as depicting an example of steps of a method implemented in the computing environment 203 (FIG. 1) according to one or more embodiments.

Beginning with box 503, the hosted application server 215 obtains a request from a wrapped application 118 (FIG. 2) executed in an incompatible client 112 (FIG. 2) to connect to a wrapper instance 218 (FIG. 2) for an application 115 (FIG. 2). The incompatible client 112 may be located remotely from the computing environment 203, and the request may be obtained via a network 206 (FIG. 2). In some cases, the request may be to reload a stored version of the wrapper instance 218.

In box 506, the hosted application server 215 executes the wrapper instance 218 in a hosted environment. The wrapper instance 218 may correspond to a virtualized or emulated environment in the hosted environment. Alternatively, the requested wrapper instance 218 may correspond to a physical mobile device in the computing environment 203. In box 509, the hosted application server 215 provides a connection between the wrapped application 118 and the wrapper instance 218 via the network 206. The connection facilitates control of a graphical user interface of the application 115 of the wrapper instance 218 by a user at the incompatible client 112. The graphical user interface may correspond to a virtualized touch-sensitive interface of the wrapper instance 218. Such applications 115 may be obtained from an application server in the computing environment 203 in some cases. The operating system of the wrapper instance 218 may differ from the operating system of the incompatible client 112.

In box 512, the hosted application server 215 obtains the graphical output, the audio output, and/or other output from the wrapper instance 218. Such outputs may be encoded via a media encoder 220 (FIG. 2). The graphical output may correspond to a video representation or other representation of a graphical user interface of the wrapper instance 218. In box 515, the hosted application server 215 sends the graphical output, the audio output, and/or other outputs to the wrapped application 118 through the connection.

In box 518, the hosted application server 215 obtains input from the wrapped application 118 through the connection. The input may correspond to sensor input, user input, etc. The input may include input commands such as a gesture relative to the graphical output. The gesture may be captured by touch-sensitive hardware of the incompatible client 112 (e.g., one or more input devices 242 (FIG. 2)). Alternatively, the gesture may correspond to a voice gesture, a video gesture, and/or other gestures. A video gesture may correspond to video input capturing users manipulating their hands, faces, etc. to express a command or other type of input. The hosted application server 215 may potentially process the input. In box 521, the hosted application server 215 provides the input to the wrapper instance 218.

In box 524, the hosted application server 215 determines whether the connection has ended. For example, the incompatible client 112 may explicitly request to end the connection or may lose connectivity. Alternatively, the hosted application server 215 may choose to end the connection. If the connection has not ended, the hosted application server 215 returns to box 512 and continues obtaining the output of the wrapper instance 218. In some cases, other incompatible clients 112 may connect concurrently to the same wrapper instance 218 via another connection.

Otherwise, if the connection is to end, the portion of the hosted application server 215 ends. In some cases, the wrapper instance 218 may continue executing without the connection, while in other cases, the wrapper instance 218 may hibernate or terminate, potentially after persisting for at least a predetermined time period. The hosted application server 215 may store an image of the wrapper instance 218 in the data store 209 (FIG. 2) in some cases.

Figure 6:
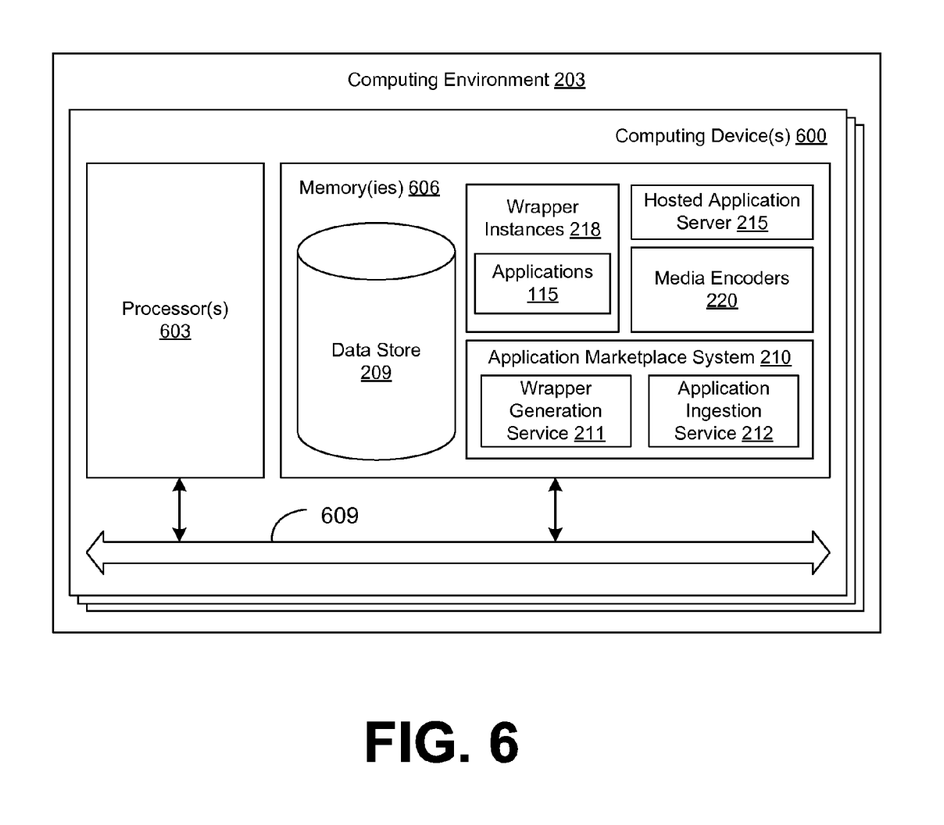
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. In one embodiment, one or more of the computing devices 600 in the computing environment 203 may correspond to physical mobile devices in which the instances of the applications 115 may be executed. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the wrapper instances 218, the applications 115, the hosted application server 215, the media encoders 220, the application marketplace system 210, the wrapper generation service 211, the application ingestion service 212, and potentially other applications. Also stored in the memory 606 may be a data store 209 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the wrapper instances 218, the applications 115, the hosted application server 215, the media encoders 220, the application marketplace system 210, the wrapper generation service 211, the application ingestion service 212, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the hosted application server 215, the application marketplace system 210, and the application ingestion service 212. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the wrapper instances 218, the applications 115, the hosted application server 215, the media encoders 220, the application marketplace system 210, the wrapper generation service 211, and the application ingestion service 212, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a plurality of computer instructions wherein, when executed by at least one computing device, the plurality of computer instructions cause the at least one computing device to at least:

obtain a first request for an application from a first client device associated with a user, the first client device executing a first device platform;

determine that the user has previously acquired a right to obtain the application;

facilitate an acquisition of the right to obtain the application by the user in response to determining that the user has not previously acquired the right to obtain the application;

determine that the application is compatible with the first client device after the user has acquired the right to obtain the application;

send the application to the first client device in response to determining that the application is compatible with the first client device;

generate a first wrapped version of the application in response to determining that the application is not compatible with the first client device, the first wrapped version of the application being compatible with the first client device, the first wrapped version of the application including a first client application that is configured to communicate with an instance of the application executed in a hosted environment;

send the first wrapped version of the application to the first client device;

obtain a second request for the application from a second client device executing a second device platform;

generate a second wrapped version of the application in response to determining that the application is not compatible with the second client device, the second wrapped version of the application being compatible with the second client device, the second wrapped version of the application including a second client application that is configured to communicate with the instance of the application executed in the hosted environment; and send the second wrapped version of the application to the second client device.

2. The non-transitory computer-readable medium of claim 1, wherein the first wrapped version of the application includes an emulator for an operating system environment.

3. The non-transitory computer-readable medium of claim 1, wherein the first client application is configured to render a user interface corresponding to the application based at least in part on a media stream generated by the instance of the application.

4. The non-transitory computer-readable medium of claim 1, wherein the first client application is configured to render a user interface corresponding to the application based at least in part on a media stream generated by the instance of the application.

5. A system, comprising:
at least one computing device; and
at least one service executable in the at least one computing device, wherein when executed the at least one service causes the at least one computing device to at least:
obtain an application to be added to an application marketplace from a developer;
generate a first wrapped version of the application that is compatible with a first target client device platform in response to determining that the application is not compatible with the first target client device platform, the first wrapped version of the application including a first client application that is configured to communicate with an instance of the application executed in a hosted environment;
add the first wrapped version of the application to the application marketplace;
generate a second wrapped version of the application that is compatible with a second target client device platform in response to determining that the application is not compatible with the second target client device platform, the second wrapped version of the application including a second client application that is configured to communicate with the instance of the application executed in a hosted environment; and
add the second wrapped version of the application to the application marketplace.

6. The system of claim 5, wherein when executed the at least one service further causes the at least one computing device to at least:

determine that a client device of a user corresponds to the first target client device platform; and
offer the first wrapped version of the application to the user through the application marketplace in response to determining that the client device of the user corresponds to the first target client device platform.

7. The system of claim 5, wherein the application is compatible with a first operating system, and the first target client device platform uses a second operating system.

8. The system of claim 5, wherein the application corresponds to a mobile application, and the first target client device platform corresponds to a target mobile device platform.

9. The system of claim 5, wherein when executed the at least one service further causes the at least one computing device to at least configure the application marketplace to advertise compatibility of the first wrapped version of the application with the first target client device platform.

10. The system of claim 5, wherein the first client application is configured to render a user interface corresponding to the application based at least in part on a media stream generated by the instance of the application.

11. The system of claim 5, wherein the hosted environment is configured to at least:
virtualize at least one input device for the instance of the application;
obtain input from the first client application; and
provide the input to the instance of the application through the at least one input device that has been virtualized.

12. The system of claim 5, wherein when executed the at least one service further causes the at least one computing device to at least configure the hosted environment for executing instances of the application.

13. The system of claim 5, wherein the instance of the application is configured to persist in the hosted environment for at least a predetermined time period after a loss of network connectivity to the first client application.

14. The system of claim 5, wherein when executed the at least one service further causes the at least one computing device to at least provide input data from the first client device to the instance of the application executed remotely from the first client device.

15. The system of claim 5, wherein when executed the at least one service further causes the at least one computing device to at least transmit output data captured from the application through the instance to the first client device.

16. A method, comprising:
in response to determining that an application is not compatible with a first client device executing a first device platform:
encoding, in the at least one computing device, a first application wrapper to facilitate execution of the application by the first client device, the first application wrapper including a first client application that is configured to communicate with an instance of the application executed in a hosted environment; and
adding, in the at least one computing device, the first application wrapper to an application marketplace; and
in response to determining that the application is not compatible with a second client device executing a second device platform:
encoding, in the at least one computing device, a second application wrapper to facilitate execution of the application by the second client device, the second application wrapper including a second client application that is configured to communicate with the instance of the application executed in the hosted environment; and adding, in the at least one computing device, the second application wrapper to the application marketplace.

17. The method of claim 16, further comprising:

obtaining, in the at least one computing device, a first request for the application from the first client device and a second request for the application from the second client device.

18. The method of claim 17, further comprising:

in response to determining that the application is not compatible with the first client device:

determining, in the at least one computing device, whether a user associated with the first request owns a compatible client device.

19. The method of claim 16, further comprising:

obtaining, in the at least one computing device, a request to initiate the instance from the first application wrapper executed in the first client device;

executing, in the at least one computing device, the instance;

obtaining, in the at least one computing device, a media stream from the instance; and sending, in the at least one computing device, the media stream to the application wrapper executed in the first client device by way of a network.

20. The method of claim 16, further comprising providing, in the at least one computing device, the application for transfer to the first client device in response to determining that the application is compatible with the first client device.

21. The method of claim 16, wherein the first application wrapper comprises an emulator of a compatible client device.

22. The method of claim 16, wherein the first application wrapper comprises code that communicates with the instance of the application executed remotely from the first client device in the hosted environment.

23. The method of claim 16, wherein the instance of the application is executed in a compatible client device.

24. The method of claim 16, wherein the instance of the application is executed in a computing environment that emulates a compatible client device.

* * * * *